United States Patent [19]
Jaki

[11] Patent Number: 4,539,443
[45] Date of Patent: Sep. 3, 1985

[54] DIRECT CURRENT MAGNETIZED HYBRID TRANSFORMER

[75] Inventor: Ivan Jaki, Norsborg, Sweden

[73] Assignee: Telefonaktiebolaget LM Ericsson, Stockholm, Sweden

[21] Appl. No.: 448,908

[22] PCT Filed: Apr. 6, 1982

[86] PCT No.: PCT/SE82/00112
§ 371 Date: Dec. 6, 1982
§ 102(e) Date: Dec. 6, 1982

[87] PCT Pub. No.: WO82/03738
PCT Pub. Date: Oct. 28, 1982

[30] Foreign Application Priority Data

Apr. 24, 1981 [SE] Sweden .................... 8102610

[51] Int. Cl.³ .................. H04B 1/58; H04M 19/00
[52] U.S. Cl. .................. 179/170 D; 179/77; 333/119; 323/355
[58] Field of Search .......... 179/170 D, 170 R, 70, 179/77; 333/119; 323/251, 332, 334, 355

[56] References Cited

U.S. PATENT DOCUMENTS

| | | | |
|---|---|---|---|
| 2,854,514 | 9/1958 | Ensink et al. | 170/170 R |
| 3,959,718 | 5/1976 | Hasegawa | 323/48 |
| 4,110,636 | 8/1978 | Dijkmans | 307/237 |
| 4,197,431 | 4/1980 | Vis | 179/70 |
| 4,234,763 | 11/1980 | Dijkmans et al. | 179/77 |
| 4,297,536 | 10/1981 | Buchner | 170/170 D |

Primary Examiner—Gene Z. Rubinson
Assistant Examiner—R. Vaas
Attorney, Agent, or Firm—Roberts, Spiecens & Cohen

[57] ABSTRACT

A direct current magnetized hybrid transformer in a telephone line repeater has both its primary windings magnetically coupled to two pairs of secondary windings, one pair creating the four-wire path in the repeater and the second pair being connected to a balance impedance. The primary windings are each divided into two parts with a like number of turns. The feeding voltage source included in the repeater is connected between the connection points common for the winding parts.

1 Claim, 6 Drawing Figures a)

b)

DIRECT CURRENT MAGNETIZED HYBRID TRANSFORMER

FIELD OF INVENTION

The present invention relates to a direct current magnetized hydrid transformer adapted for being included in a telephone repeater and connected between a two-wire line and the repeater to provide a transfer between the two-wire and four-wire circuits in the repeater. More particularly, the invention relates to a hybrid transformer adapted for use in repeaters, and adapted for being used to transform analogue telephone signals coming from a line into PCM-coded signals and vice versa.

BACKGROUND

For converting analogue telephone signals from a particular subscriber across a particular line, repeaters are used to provide two different signal paths. In one of these paths the analogue signals are coded to the PCM-coded signals and in the other a decoding of the digital PCM-coded signal flow is carried out. Furthermore, amplifiers are used to compensate for the attenuation of the line. It is also known to use a direct current magnetized hydrid transformer for dividing the input of a repeater towards the two-wire line, the transformer feeding the desired current to the subscriber's set connected to the line. At the same time, a DC-magnetizing of the transformer core is obtained.

SUMMARY OF INVENTION

For constructing transformer hydrids included in repeaters, there are certain requirements regarding the design of the hybrid and consideration must be given to the DC-magnetizing of the transformer. Firstly, the input terminals on the two-wire side should be balanced to a ground point, since otherwise so-called longitudinal currents arise across the line. Secondly, a balance impedance should be connected to the transformer so that the impedance as seen from the hybrid towards the two-wire side can be balanced out; i.e., an impedance match is to be achieved to the incoming line. Finally, the echo attenuation on the two-wire side has to be high for impedances (i.e., line and subscriber's set impedances) which are connected to the two-wire side of the hybrid. Otherwise reflections arise across the line between the hybrid and the subscriber's set.

In addition, there may be problems in connection with a DC-magnetized hydrid transformer to preventing incoming speech voltages from being short-circuited via the current loop through which direct current is supplied from a battery towards the associated line. Current supply has previously been provided via current transformers with high output impedance or else a choke has been connected in series with the associated direct current source (see attached FIGS. 2 and 3 discussed below). Especially for a DC-magnetized hybrid transformer, there are certain requirements for the current durability of the core material (i.e., in order to obtain the desired inductance, the direct current should have a certain value for obtaining the transformer function).

In accordance with the invention the above-mentioned problems are solved by dividing the two primary windings at the line side of the hybrid into two winding parts each, and by connecting the feeding voltage source, which primarily will supply the subscriber with direct current, to the common connection point between the two winding parts. More particularly, in accordance with the invention there is provided a direct current magnetized hybrid transformer adapted for being included in a repeater for a telephone line to provide a two-wire to four-wire coupling. The line is known to have a determinable impedance. The transformer comprises a first primary winding and a first pair of secondary windings magnetically coupled thereto. There is also included a second primary winding with a second pair of secondary windings being magnetically coupled thereto. The secondary windings create a four-wire path. At least one winding from each pair is connected to a balancing impedance which is matched to the line impedance. The first and secondary primary windings each include two winding parts, each having a respective number of turns such that the number of turns of one of said winding parts is in a determined relationship to the number of turns of the other of the winding parts. A common connection point is provided between the parts of each of the primary windings and a feeding source is connected between the common connection point. Therefore, a magnetization takes place of only one of the winding parts of each of the first and secondary primary windings. In addition there is provided a capacitor. The first and second primary windings include respective first terminals connected to the telephone line and respective second terminals connected by the capacitor.

Other objects, features and advantages of the invention will be found in the detailed descriptive which follows hereinafter as illustrated in the accompanying drawings.

BRIEF DESCRIPTION OF DRAWINGS

The invention will be more fully described with reference to the accompanying drawings, wherein.

DETAILED DESCRIPTION OF THE INVENTION

Figure 1:
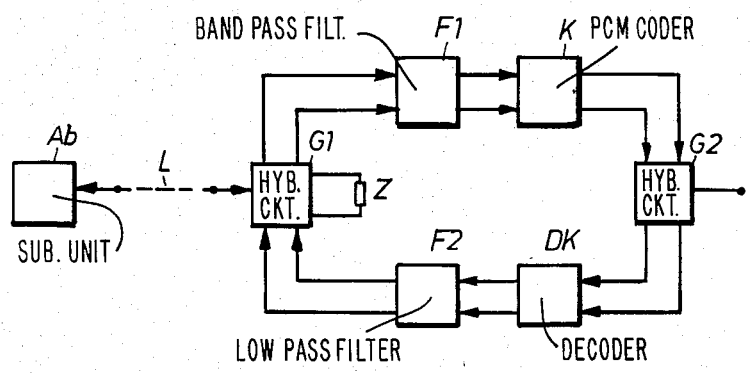
FIG. 1 is a block diagram of a telephone repeater and its connection to a subscriber via a two-wire line.

The block diagram according to FIG. 1 is an over-all diagram of a repeater in which the hybrid transformer according to the invention is used. A subscriber unit Ab is via a line L connected to a hybrid circuit G1, the function of which is to couple the incoming two-wire line L to a four-wire line. To the hybrid connection G1, a balance impedance Z is connected in order to simulate the impedance of the subscriber unit Ab and the line L seen from the two-wire side of the hybrid circuit. The four-wire line is divided into a first signal path, which contains a bandpass filter F1 for the speech band (for example 0.2–3.4 kHz) and a PCM-coder K for converting the analogue signals from the subscriber unit Ab to a PCM-bit flow which is transmitted across the output of the repeater via the hybrid circuit G2. Incoming PCM-coded signals to the repeater are converted in the decoder DK in the second signal path to corresponding analogue signals and transmitted via a lowpass filter F2 and eventually via an amplifier, not shown, to the hybrid circuit G1.

Figure 2:
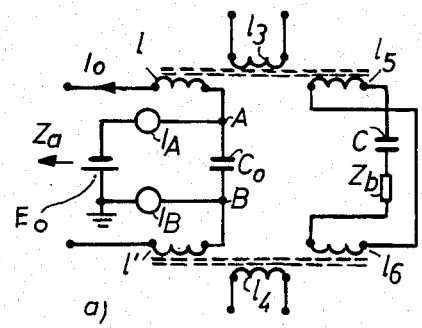
FIGS. 2 and 3 show two different hybrid transformers of known kind.
Figure 3:
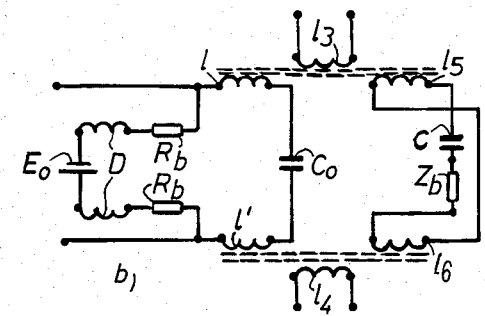

FIGS. 2 and 3 show a circuit diagram of previously known constructions of the hybrid circuit G1 of FIG. 1. In the construction according to FIG. 2, the two windings 1 and 1' of the hybrid transformer are fed from a voltage source $E_o$ connected to each of the winding end points via two current transformers $I_A$ and $I_B$ so that a direct current I is flowing through each of the windings 1, 1'. Thereby is obtained current feeding to the subscriber unit Ab and simultaneously the windings 1 and 1' are premagnetized to a certain value. One pole of the feeding voltage source is grounded, the two-wire input to the line L then being balanced relative to ground. In a second alternative according to FIG. 3, the feeding voltage source $E_o$ is connected in series between two similar windings of a choke D. Two current limiting resistances are designated $R_b$. The circuit according to FIG. 2 is considered to be expensive, especially when a high degree of balance towards ground is required. The circuit according to FIG. 3 is more advantageous and simpler to dimension. However, the choke D requires a large volume when designed with passive components. The embodiment according to FIG. 3 cannot be used when the mechanical construction of the printed card requires limited height (usually about 13.5 mm) due to the size choke D. Each of the circuits of FIGS. 2 and 3 include secondary windings 13, 14, 15 and 16 with windings 15 and 16 being connected by capacitor C and impedance Zb.

Figure 4:
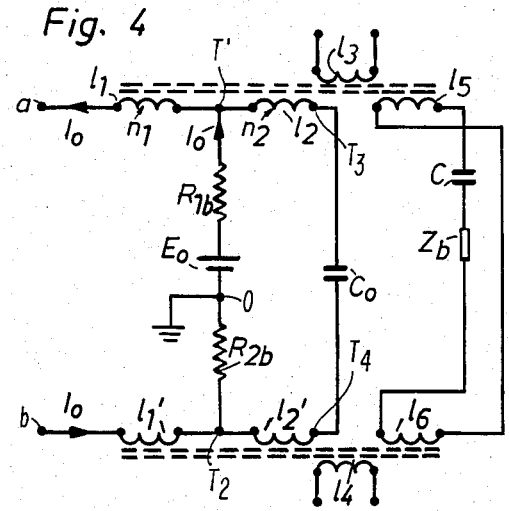
FIG. 4 is a circuit diagram of a hybrid transformer according to the invention.

In FIG. 4 an embodiment is shown of the hybrid transformer according to the invention. The winding L according to FIGS. 2 and 3 connected to the two-wire line L with one end point is divided into two parts $l_1$ and $l_2$ each with respective dividing winding turns $n_1$ and $n_2$. In the same way the winding $l_1$ according to FIGS. 2 and 3 is divided into two parts $l_1'$ and $l_2'$ with the same number of turns $n_1$ and $n_2$. The connecting points T1 and T2 between the two winding parts $l_1$, $l_2$ and $l_1'$ $l_2'$, respectively are connected to the feeding voltage source $E_o$, the internal resistance of which is symbolized by the resistances $R_{1b}$ and $R_{2b}$, since its negative pole is grounded according to the Figure. The resistance $R_{1b}$ should be equal to $R_{2b}$ to fulfil the requirement of symmetry relative to ground in the two-wire input terminals to the line. The end points T3 and T4 of the two windings $l_2$, $l_2'$, as well as of the known hybrid circuits according to FIGS. 2 and 3, are connected to a common coupling capacitor $C_o$. The feeding direct current $I_o$ will then according to FIG. 4 flow from the feeding voltage source $E_o$ through the resistance $R_{1b}$, one winding $l_1$, the line L, the subscriber unit Ab, the line L, the second winding $l_1'$ and through the resistance $R_{2b}$ back to the voltage source $E_o$.

Figure 5:
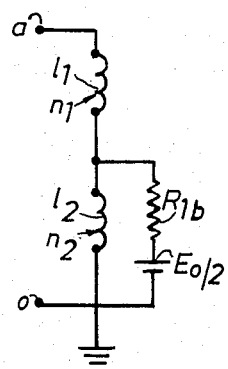
FIG. 5 is a simplified circuit diagram of one input side of the transformer according to FIG. 5.

The internal resistance $R_{1b}$ connected to one terminal a of the line side of the hybrid transformer will be transformed to a higher value by the dividing of the primary winding into the part windings $l_1$ and $l_2$ according to $$R_{1b}' = \left( \frac{n_1 + n_2}{n_2} \right) 2 \cdot R_{1b}$$

as is shown in FIG. 5. The influence of the coupling capacitor $C_o$ on the speech currents can be neglected. According to this Figure, the primary winding will form an autotransformer on account of the two winding halves $l_1$ and $l_2$ being magnetically coupled. The ground point O in FIG. 5 corresponds to the ground point O in FIG. 4. According to known principles for an autotransformer, the following is valid for the resistance $R_{1b}$ as seen from the terminals a–O $$\frac{R_{1b}'}{R_{1b}} = \left( \frac{n_1 + n_2}{n_1} \right) 2 \text{ and thus}$$

$$R_{1b}' = R_{1b} \left( \frac{n_1 + n_2}{n_1} \right) 2 \text{ according to the above.}$$

The same is valid for the two winding parts $l_1$ and $l_2$ at the input terminal b relative to ground point O. The internal resistance $R_{1b}$, $R_{2b}$ of the feeding voltage source, as seen from the two input terminals a and b is thus transformed by a factor $$\left( \frac{n_1 + n_2}{n_1} \right) 2$$

Should, for example, $n_1 = n_2$ be chosen a four-fold increase of the resistance values $R_{1b}$ and $R_{2b}$ respectively will be obtained. As a consequence, the choke D necessary in FIG. 3 can be saved.

According to the circuit diagram in FIG. 4, the premagnetizing current $I_o$ only flows through part of the primary winding ($l_1$ and $l_1'$ respectively) of the hybrid transformer. Therefore, the direct current premagnetization is lowered by a factor ($^n1/n_1 + n_2$), since the inductance of the primary winding is proportional to the square of the number of turns n. Due to this, the cross sectional area of the transformer core, for example, can be reduced, since the premagnetization of the core is inversely proportional to the cross sectional area of the core according to $$\frac{L - I_o^2}{A_{fe}}$$

Alternatively, a core material reactin to lower current can be used; i.e., a material which maintains a higher inductance for a smaller premagnetization current.

Figure 6:
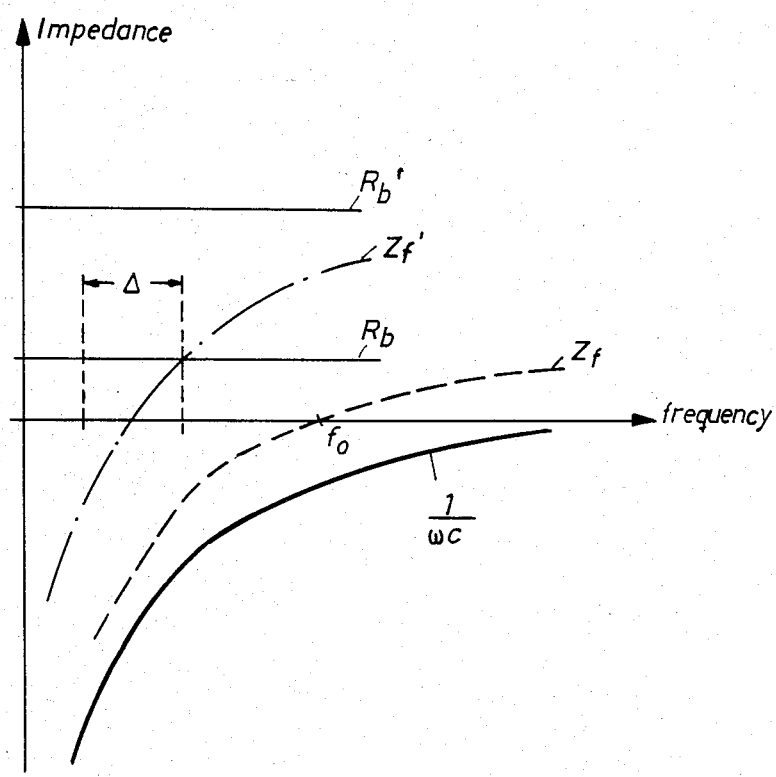
FIG. 6 is an impedance diagram.

An additional advantage is that an improved filtering of noise tones from the voltage source can be obtained by the proposed circuit. As seen from the feeding voltage source, the respective resistance $R_{1b}$, $R_{2b}$ lies in series with the coupling capacitor $C_o$. In the diagram according to FIG. 6, the impedance $Z_f$ of the filter created by the respective resistance $R_{1b}$, $R_{2b}$ and the capacitor $C_o$ is shown. The dashed line shows the impedance characteristic as the sum of the resistance value, for example $R_{1b}$, and the reactance $1/\Omega$ of the capacity $C_o$. The impedance $Z_f$ for this lower value $R_{1b}$ has a zero crossing (is resistive) at a frequency $f_o$ which generally is considerably higher than the speech band $\Delta$. Thus the filter $R_{1b}$, winding $l_2$, and capacitor $C_o$ give a relatively poor filtering of the noise tones from the voltage source $E_o$ lying within the speech band. By transforming the resistance $R_{1b}$ to a higher value, the filter impedance $Z_f'$ will instead have its zero crossing within the speech band for which reason the noise tones can be coupled by the filter and do not reach the line or any of the four wire paths of the repeater via the windings l₃ and l₄.

In the above embodiment of the invention it is assumed that the line impedance has a susceptive character, the balance impedance $Z_b$ having likewise a susceptive character. The proposed hybrid can naturally be used for lines with inductive or resistive character.

What we claim is:

1. A direct-current magnetized hybrid transformer adapted for being included in a repeater for a telephone line to provide a two-wire to four-wire coupling in the repeater, said line having a determinable line impedance, said transformer comprising a first primary winding, a first pair of secondary windings magnetically coupled to said first primary winding, a second primary winding, a second pair of secondary windings magnetically coupled to said second primary winding, a balancing impedance, the first and second pairs of secondary windings creating a four-wire path, at least one winding from each pair being connected to said balancing impedance said balancing impedance being matched to the line impedance, said first and second primary windings each including two winding parts, each primary winding having a number of turns such that the number of turns of one of said winding parts is in a determined relation to the number of turns of the other of said winding parts, a common connection point between the parts of each said primary winding, a feeding source means connected between the connection points and magnetizing only one of the winding parts of both the first and second primary windings, and a capacitor, the first and second primary windings including respective first terminals connected to said telephone line and respective second terminals connected by said capacitor.

* * * * *